United States Patent [19]
Keir

[11] 3,766,395

[45] Oct. 16, 1973

[54] FLUID LEVEL DETECTION SYSTEM

[75] Inventor: Alexander S. Keir, Attleboro, Mass.

[73] Assignee: Texas Instruments Incorporated, Dallas, Tex.

[22] Filed: Dec. 27, 1971

[21] Appl. No.: 212,078

[52] U.S. Cl.............. 250/214 R, 73/293, 250/218, 304/244 R
[51] Int. Cl............................................. G01f 23/00
[58] Field of Search.................... 73/293; 307/305, 307/311; 250/214, 218; 340/244 R

[56] References Cited
UNITED STATES PATENTS

| | | | |
|---|---|---|---|
| 3,535,933 | 10/1970 | Pliml | 350/96 R |
| 3,104,323 | 9/1963 | Over | 307/311 |

FOREIGN PATENTS OR APPLICATIONS

| | | | |
|---|---|---|---|
| 267,898 | 1/1969 | Austria | 73/293 |
| 249,163 | 9/1966 | Austria | 307/311 |

Primary Examiner—Richard C. Queisser
Assistant Examiner—Denis E. Corr
Attorney—Harold Levine et al.

[57] ABSTRACT

A system is disclosed for detecting the presence or absence of a medium and includes a radiation emitting means and a radiation responsive means selectively coupled to the radiation emitting means responsive to the absence of the medium. The radiation responsive means has an electrical property which varies in response to the incidence of radiation thereon. In addition, a selectively energizable switch means having a control element is coupled to the radiation responsive means through a selectively energizable coupling means having a predetermined substantially constant voltage threshold level, whereby the state of energization of the switch means is controlled responsive to variations in the electrical property of the radiation responsive means substantially independently of variations in power being supplied to the system.

20 Claims, 7 Drawing Figures

INVENTOR.
Alexander S. Keir

INVENTOR.
Alexander S. Keir
BY

Att'y.

FLUID LEVEL DETECTION SYSTEM

The present invention relates generally to detection systems and more particularly is directed to an improved system for use with fluid level detectors.

Various types of fluid level detectors have been developed in recent years in which optical energy is utilized for sensing the presence or absence of a fluid medium. In addition, various types of electrical systems have been developed for use in conjunction with such detectors. However, in certain instances problems have arisen due to variations in supply voltage causing improper operation of the system, failure of certain elements in the system may remain undetected permitting improper operation, etc.

Accordingly, it is an object of the present invention to provide an improved system for use in detecting the presence or absence of a medium.

It is another object of the present invention to provide an improved system for use in detecting the presence or absence of a fluid medium, which system is substantially independent of variations in the power supplied thereto over a relatively wide range.

Various additional objects and advantages of the present invention will be readily apparent from the following detailed description and accompanying drawings wherein.

Figure 1:
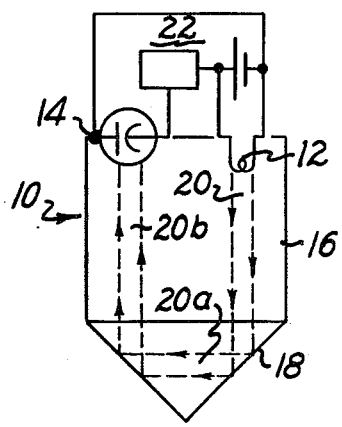
FIG. 1 is a schematic illustration of a typical fluid level detector.

Referring generally to the drawings and initially to FIG. 1 a typical example of a fluid level detector is schematically illustrated and indicated generally by the reference numeral 10. Further detailed examples of such detectors are set forth in U.S. Pat. Application Ser. No. 93,212 filed Nov. 27, 1970 and assigned to the assignee of the subject application as well as in U.S. Pat. Application Ser. No. 212,030, filed concurrently herewith and also assigned to the assignee of the subject patent application. The detector 10 generally includes a suitable radiation emitting means 12 which may comprise an emitter of optical radiation or light, and a radiation responsive means 14, typically a light responsive device such as a photoelectric cell, a photoresistor, etc., having an electrical property, such as resistance, which varies in response to the incidence of light thereon. The light emitter 12 and the light sensor 14 are selectively coupled through a light transmitting medium 16 with the light emitter 12 and the light sensor 14 being disposed at one end of the light transmitting medium 16 while a suitable light refracting prismatic body 18 is arranged at the opposite end of the light transmitting means 16 for effecting reflection of the emitted light to the light sensor 14 only under certain conditions. More particularly, the prismatic body 18 may have a generally conical configuration having its base coupled to the light transmitting medium 16 and having its vertex projecting outwardly therefrom in a direction toward the medium, the presence or absence of which is to be detected. More particularly, when the medium which generally comprises a fluid medium, having a similar index of refraction to the prismatic body, is in contact with the external surface of the prismatic body 18, hereinafter referred to as the wet condition, light which is emitted from the light emitter along a light emission path 20 passes directly through the prismatic body and into the fluid medium with essentially none of the emitted light being reflected back to the light sensor 14. Under such conditions, the light sensing means 14, which, as previously mentioned, may comprise a photoelectric cell remains in a high resistance mode. However, when the external surface of the prismatic body 18 is not in contact with the fluid, hereinafter referred to as the dry condition, the light emitter along the light emission path 20 is reflected along a first light reflection path 20a generally parallel to the base of the prismatic body from one portion of the external surface thereof and then along another light reflection path 20b from an opposed external portion of the surface of the prismatic body toward the light sensor 14. When this reflected light reaches the light sensor it causes the light sensor to operate in its low resistance mode. Typically an electrical circuit indicated generally by the reference numeral 22 is coupled to the light emitter 12 and the light sensor 14 for energizing these devices as well as for providing an indication or effecting other appropriate action responsive to the presence (wet condition) or absence (dry condition) of the fluid medium. In accordance with the principles of the present invention a variety of unique electrical circuits are provided, as illustrated in FIGS. 2–7, for accomplishing such functions.

Figure 2:
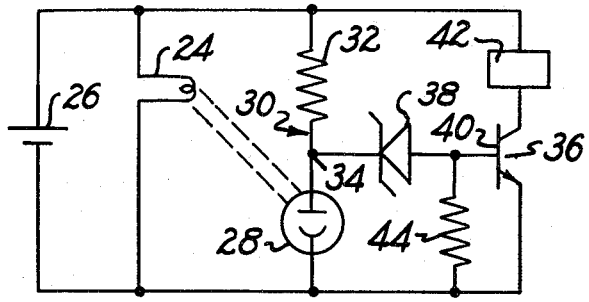
FIG. 2 is an electrical schematic circuit diagram in accordance with the principles of the present invention for use in conjunction with a detector such as that illustrated in FIG. 1.

Referring to FIG. 2, one embodiment of a circuit in accordance with the present invention is illustrated. As shown, a suitable radiation emitter 24, such as a light emitter, is connected across a power supply 26. A radiation responsive means 28 having an electrical property which varies in response to the incidence of radiation thereon is provided. The radiation responsive means 28 preferably comprises a photoelectric cell having a resistance which varies in response to the incidence of light thereon and is selectively optically coupled to the light emitter 24. Typically, the photoelectric cell is operative in a high resistance mode in the absence of incident radiation thereon associated with the detector 10 (FIG. 1) being in its wet condition, and is operative in a low resistance mode responsive to the incidence of optical radiation thereon associated with the detector 10 (FIG. 1) being in its dry condition. More particularly, the photoelectric cell 28 defines one leg of a voltage divider configuration 30 the other leg of which is defined by a resistor 32 coupled to the photoelectric cell and defining a junction 34 therewith. The voltage divider 30 is connected across the source of power 26, as shown, while the junction 34 is coupled to a selectively energizable switch means 36 through a coupling means 38 having a predetermined substantially constant voltage threshold level, the coupling means 38 remaining de-energized until its threshold voltage is exceeded. The selectively energizable switch means 36 includes a control element 40 which controls the state of energization of the selectively energizable switch means 36, and is coupled to one terminal of the coupling means 38, the other terminal of the coupling means 38 being connected to the voltage divider junction 34. Thus, the voltage established at the voltage divider junction 34 may be seen to vary in response to the resistance mode of the photoelectric cell 28 and when this voltage level exceeds a predetermined value in excess of the threshold voltage level of the coupling means 38 an energizing signal is applied therethrough to the control element 40 of the selectively energizable output switch means 36 so as to render the same energized. In this connection the selectively energizable switch means 36 preferably comprises an NPN transistor with its base comprising the control element 40. The coupling means 38 preferably comprises a zener diode which connects the voltage divider junction 34 to the base 40 of the transistor 36. In addition, means 42 is connected to the collector-emitter circuit of the transistor 36 adapted to be energized in response to conduction of the transistor 36 associated with operation of the photoelectric cell 28 in its high resistance mode (wet condition). The means 42 may comprise a suitable indicator light for providing an indication of proper or improper fluid level, it may comprise a relay for operating an associated valve or pump mechanisms, etc. In addition, a resistor 44 is preferably connected across the base-emitter input of the transistor 36 in order to prevent inadvertent turn-on of the transistor due to leakage current through the zener diode 38.

To briefly summarize operation of the system shown in FIG. 2, when the detector is in its wet condition substantially no incident light impinges on the photoelectric cell 28 and accordingly it remains in its high resistance mode of operation. Consequently, a sufficient voltage level is established at the voltage divider junction 34 to trigger the zener diode 38 and thereby effect turn-on of the transistor 36. Furthermore, in accordance with an important feature of the present invention in the event of a variation in the operation of the power supply, such as an increase in the voltage, the additional power supplied would only tend to drive the transistor 36 further into saturation so that it would remain in its proper conductive condition even if the increased voltage level were to cause sufficient increased light emission from the light emitter 24 such that some light were to be improperly received by the photoelectric cell 28 lowering its resistance. Similarly, in the event of a decrease in the voltage level applied, the relatively high resistance of the photoelectric cell 28 would result in the voltage level at the junction 34 remaining sufficient to maintain the transistor 36 in its conductive condition. When the detector is in its dry condition, emitted light is received by the photoelectric cell 28 to effect operation thereof in its low resistance mode. Consequently the voltage level at the junction 34 is substantially reduced to a level insufficient to overcome the zener diode voltage, and the transistor 36 is rendered non-conductive. In the event of a variance in the power supply voltage, such as an increase, the light emitter 24 which is connected across the power supply would emit more light so that further lowering of the resistance of the photoelectric cell 28 would result, and the additional current flow through the resistor 32 and the photoelectric cell 28 would not increase the voltage level at the junction 34 sufficiently to trigger the zener diode 38 so that the transistor 36 would remain in its non-conductive condition. Similarly, a decrease in voltage would merely result in the transistor 36 remaining non-conductive.

Figure 3:
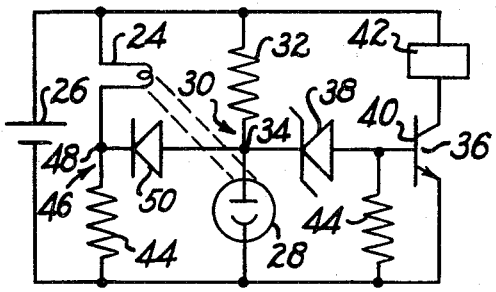
FIG. 3 is an electrical schematic circuit diagram of another embodiment of a system similar to that illustrated in FIG. 2.

In certain instances it may be desirable to provide an additional protective feature in the event of possible misoperation of the light emitter, which could occur due to a fracture in its filament, for example, as the result of being subjected to mechanical shock. Accordingly, the embodiment illustrated in FIG. 3, which is generally similar to the FIG. 2 embodiment includes additional protective means, to indicate such misoperation. More particularly, as shown, the voltage divider 30 includes the resistor 32 defining one leg thereof and the photoelectric cell 28 defining the other leg thereof with the junction 34 being defined therebetween is again coupled to the base 40 of transistor 36 through the zener diode 38. In addition, the light emitter 24 is coupled to another resistor 44 to define a voltage divider configuration 46 having a junction 48 therebetween, the voltage divider 46 being connected across the power supply 26. The junction 48 is electrically isolated from the junction 34 by a selectively operable coupling means 50 illustrated as a blocking diode. When the light emitter 26 is operating properly operation of the system illustrated in FIG. 3 is essentially identical to that of the FIG. 2 embodiment, i.e., in the wet condition the voltage level established at junction 34 is sufficient to overcome the threshold voltage of the zener diode 38, thereby rendering the transistor 36 conductive, whereas, in the dry condition the voltage level at the junction 34 is below the threshold voltage of the zener diode 38 due to the low resistance mode operation of the photoelectric cell 28 thereby maintaining the transistor 36 non-conductive. As shown, the cathode of diode 50 is coupled to the junction 48 of the voltage divider 46 so that during operation in either the wet or dry condition the voltage level established across the light emitter 24 is sufficient to maintain a positive voltage at the cathode of diode 50, maintaining the diode 50 in its reverse biased condition thereby maintaining the junction 34 electrically isolated from the junction 48. However, in the event of misoperation of the light emitter 24 due to a fracture of the filament, for example, a voltage is established at the junction 48 in response to such a condition which causes the diode 50 to be forward biased. As a result, current being supplied through the resistor 32 to the junction 34 of voltage divider 30 is caused to be shunted through the forward biased diode 50 and through the resistor 44 connected thereto thereby preventing the establishment of a sufficient voltage level at junction 34 to render the transistor conductive. As a result, an indication is provided of operation of the system in the dry state, thereby indicating the existence of a problem in the system so as to enable correction to be effected.

Figure 4:
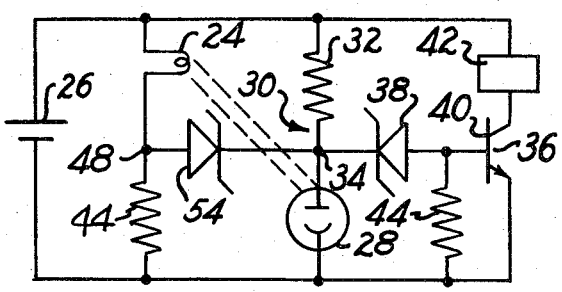
FIG. 4 is an electrical schematic circuit diagram of an alternative embodiment of the system illustrated in FIG. 3.

Since a substantial amount of power may be dissipated across the resistor 44 due to the voltage level which must be maintained at the junction 48 to retain the diode 50 in its reverse biased condition another embodiment of the system is illustrated in FIG. 4 to alleviate this situation, since limited power may be available in some instances. The FIG. 4 embodiment is substantially similar to that set forth in FIG. 3 and operates in a substantially similar fashion except that the diode 50 is replaced by a zener diode 54 having its anode coupled to the voltage divider junction 48 and having its cathode coupled to the voltage divider junction 34. As a result the zener diode is maintained in its de-energized state for electrically isolating the junction 48 from the junction 34 without the necessity for a substantial voltage level being maintained across the resistor 44 so that a substantially greater voltage level may be maintained across the light emitter 24 with very little power being developed across the resistor 44. Nevertheless, similarly to the FIG. 3 embodiment in the event of mis-operation of the light emitter 24 a sufficient voltage level is established at the junction 48 sufficient in excess of the threshold voltage of the zener diode 54, rendering the zener diode 54 conductive. Consequently, current is shunted from the junction 34 and through the zener diode 54 and the resistor 44 so as to prevent the establishment of a sufficient voltage level at junction 34 to render the transistor 36 conductive.

Figure 5:
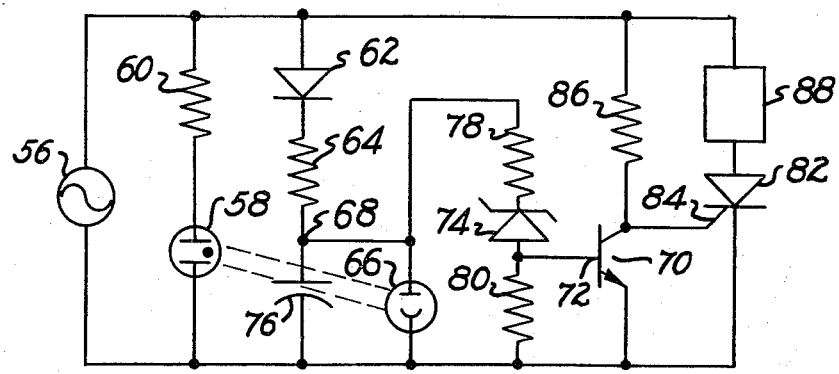
FIG. 5 is an electrical schematic circuit diagram of another embodiment of the system in accordance with the principles of the present invention.

In certain instances it may be desirable to provide a system such as that set forth hereinabove which is operable from an a.c. supply. Such a system is illustrated in FIG. 5 in which an a.c. power supply 56 is provided. In this embodiment a light emitter 58 is provided, such as a neon bulb, which operates efficiently when energized from an a.c. power source, the neon bulb 58 being connected to a current limiting resistor and across the power supply. Half-wave rectified power is supplied through a half-wave rectifier diode 62 and a current limiting resistor 64 which are coupled to a light responsive device 66, such as a photoelectric cell, the photoelectric cell 66 cooperating with the resistor 64 to define a voltage divider configuration including a junction 68 therebetween. A selectively energizable switch means 70 such as a transistor having a control element or base 72 is again provided coupled to the voltage divider configuration 68 through a voltage responsive coupling device 74 having a predetermined threshold voltage, such as a zener diode. Accordingly, upon the establishment of a predetermined voltage level at the junction 68 responsive to operation of the photoelectric cell 66 in its high resistance mode (wet condition) the threshold voltage of the zener diode 74 is exceeded and the transistor 70 may be rendered conductive. In addition, a capacitor 76, preferably comprising an electrolytic capacitor, is also coupled to the half-wave rectifier diode 62 and is connected to the zener diode 74 and the base of transistor 72 through a timing resistor 78 which cooperates with the capacitor 76 so as to assure continuous current flow through the zener diode 74, after its threshold voltage is exceeded, by averaging the half-wave rectified a.c. power being supplied, thereby assuring conduction of the transistor 70 during both half cycles of applied power. A leakage resistor 80 is also connected across the base-emitter input of the transistor 70 to prevent inadvertent conduction thereof. Furthermore, in the embodiment illustrated in FIG. 5 a selectively energizable gate-controlled output switch means 82 is provided having a control terminal or gate 84 connected to the power supply 56 through a gate resistor 86. The gate resistor 86 is also connected to the collector-emitter circuit of transistor 70, as shown, so that when transistor 70 is conductive, corresponding to a wet condition, gate current for the output switch means 82 is shunted through the collector-emitter circuit of transistor 70 and the output switch is maintained in a non-conductive or de-energized condition. Similarly, when the transistor 70 is rendered non-conductive, corresponding to a dry condition, gate current is supplied to the output switch through the gate resistor 86 rendering the output switch conductive. In the embodiment illustrated the output switch 82 preferably comprises a silicon controlled rectifier and, as shown, a suitable indicating means 88 may be connected to its anode-cathode circuit so as to provide an indication of conduction thereof indicative of a dry condition and non-conduction thereof indicative of a wet condition.

Figure 6:
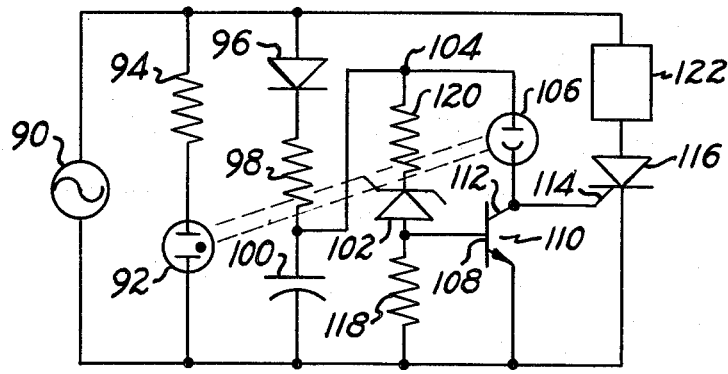
FIG. 6 is an electrical schematic circuit diagram of an alternative embodiment of the system illustrated in FIG. 5.

In certain instances it may be desirable to achieve improved control of the conduction of the silicon controlled rectifier at the initiation of a cycle of applied a.c. power. Accordingly, an embodiment such as that illustrated in FIG. 6 is provided which is somewhat similar to that shown in FIG. 5. In the FIG. 6 embodiment an a.c. power supply 90 is again employed. A bulb 92 is provided connected to a current limiting resistor 94 and these elements are connected across the power supply. Half-wave rectified power is again applied through a half-wave rectifier diode 96 and a current limiting resistor 98 connected to a current averaging capacitor 100, while a voltage responsive device 102, such as a zener diode, is connected to a voltage divider junction 104 defined between the resistor 98 and a photoelectric cell 106. The zener diode 102 is again connected to a base 108 of a transistor 110 so as to control the conduction thereof. However, in this instance it may be seen that the photoelectric cell 106 is connected with the collector 112 of the transistor 110 and with the gate 114 of a silicon controlled rectifier 116 which functions as an output switch. In addition, a leakage resistor 118 is connected across the base-emitter input of the transistor 110 to preclude inadvertent turn-on thereof and a timing resistor 120 is connected between the voltage divider junction 104 and the zener diode 102 to assure continuous current flow through the zener diode during both half cycles of applied power, when the threshold voltage of the zener diode 102 has been exceeded. Similarly, a suitable output indicating means 122 is again connected to the anode-cathode circuit of the silicon controlled rectifier. In operation of the system illustrated in FIG. 6, when the system is in its wet condition and the photoelectric cell 106 is in its high resistance mode due to the absence of incident light thereon, a sufficient voltage level is established at the junction 104 to exceed the threshold voltage of the zener diode, which is energized, thereby rendering the transistor 110 conductive. Consequently, gate current is shunted from the gate 114 of the silicon controlled rectifier 116 through the collector-emitter circuit of the conductive transistor 110. Furthermore, even in the event of a change in the resistance level of the photoelectric cell 106 due to power variations, or the like, unless sufficient light reaches the photoelectric cell 106 indicative of a dry condition the transistor 110 remains in its conductive state and current continues to be shunted through its collector-emitter circuit and away from the gate 114. Similarly, when the photoelectric cell 106 is in its dry condition responsive to sufficient light incident thereon, the voltage level at the junction 104 becomes insufficient to maintain the transistor 110 in its conductive condition, due to operation of the photoelectric cell 106 in its low resistance mode. In this regard, the voltage level at the junction 104 becomes insufficient to maintain the zener diode triggered and the base current to the transistor 110 is disrupted thereby, rendering the transistor 110 non-conductive. Accordingly, gate current is no longer shunted through the collector-emitter circuit of transistor 110, but is supplied from the half-wave rectifier diode 96 through the photoelectric cell 106 to the gate 114 of the silicon controlled rectifier 116, rendering the silicon controlled rectifier conductive. It may be seen that conduction of the silicon controlled rectifier 116 is thus initiated relatively rapidly since positive d.c. gate current is supplied through the low resistance photoelectric cell 106 concurrently with the initiation of a positive a.c. half-wave cycle of applied power. Furthermore, in accordance with an additional advantage of the system illustrated in FIG. 6, when the device undergoes a transition from the dry to the wet state as the voltage level at the junction 104 exceeds the threshold voltage of the zener diode 102 and the transistor 110 begins to conduct, the photoelectric cell 106 is similarly undergoing a transition to its high resistance mode. For hard conduction of the transistor 110 to occur the photoelectric cell 106 must increase in resistance, sufficiently to effect the establishment of a sufficient voltage level, at the junction 104. However, the requisite increase in resistance of the photoelectric cell 106 is minimized since the photoelectric cell 106 is coupled to the collector 112 of transistor 110 whereby the transistor collector current is reduced as the photoelectric cell resistance increases. Accordingly, a relatively lesser change in relative resistance of the photoelectric cell 106 is required before hard conduction of the transistor 110 and associated shunting of gate current from the silicon controlled rectifier 116 takes place.

Figure 7:
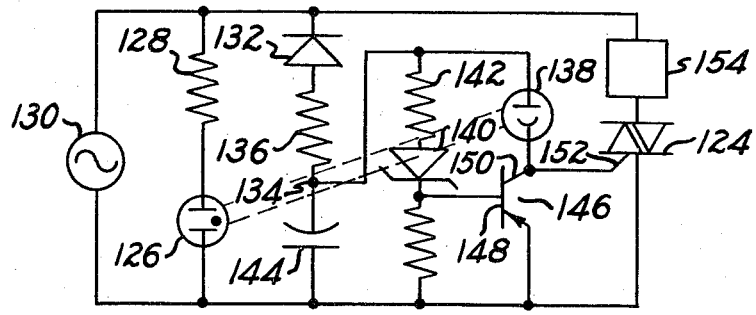
FIG. 7 is another alternative embodiment of a system similar to that illustrated in FIG. 6.

Still another embodiment of the present invention is illustrated in FIG. 7 in which a selectively energizable output switch means 124, comprising a triac is employed. This embodiment is substantially similar to that set forth in FIG. 6 except for the necessary reversal of polarity of certain of the elements necessitated by the utilization of the triac 124 comprising the output switch means, instead of the silicon controlled rectifier. More particularly, in this embodiment a bulb 126 is connected to a current limiting resistor 128 and these elements are connected across an a.c. power supply 130. Half-wave rectified power is again supplied through a half-wave rectifier diode 132 connected in an opposite polarity configuration with respect to the embodiment illustrated in FIG. 6 in order to permit proper gating of the triac 124. A voltage divider junction 134 is again defined intermediate a resistor 136 coupled to the diode 132 and a photoelectric cell 138. A zener diode 140 having a predetermined threshold voltage is again coupled to the voltage divider junction 134 through a timing resistor 142 which cooperates with a capacitor 144 coupled thereto to provide continuous current through the zener diode, after the threshold voltage of the zener diode has been exceeded. A transistor 146 is again provided, having its base 148 coupled to the zener diode 140 and its collector 150 coupled to the photoelectric cell 138. The transistor 146 is rendered conductive when the threshold voltage of the zener diode 140 is exceeded. However, in this instance the transistor 146 comprises a PNP transistor. The triac 124 includes a gate 152 which is coupled to the collector 150 of transistor 146 and to the photoelectric cell 138, the latter being connected with the collector 150 and the gate 152 so that d.c. gating signals are supplied to the gate 152 from the diode 132 and through the photoelectric cell 138 when the transistor 146 is non-conductive, while such gating signals are shunted away from the gate 152 and through the collector-emitter circuit of transistor 146, when the transistor is conductive. In addition, a suitable indicating or control means 154 is serially connected to the triac power terminals and is energized in response to conduction of the triac. In operation of the embodiment illustrated in FIG. 7, when in the wet condition, the photoelectric cell 138 is in its high resistance mode and accordingly a sufficient voltage level is established at the junction 134 to render the transistor 146 conductive. As a result, triac gating signals are passed through the photoelectric cell 138, but are shunted through the collector-emitter circuit of the transistor 146 so that triggering of the triac 124 is prevented. However, in the dry condition the photoelectric cell 138 becomes operative in its low resistance mode, whereupon an insufficient voltage level is established at the junction 134 to maintain conduction of the transistor 146, which is thereby rendered non-conductive. Consequently, d.c. gating signals are permitted to flow to the gate 152 of the triac 124 from the half-wave rectifier diode 132 to effect conduction of the triac and energization of the indicating means 154. The system illustrated in FIG. 7 may be quite advantageous in certain instances since conduction of the triac is effected at the initiation of the half cycle of applied power and the d.c. gating current is supplied through the low resistance photoelectric cell 138, whereby substantially rapid energization of the indicating means 154 is effected responsive to a dry condition.

Thus, a plurality of unique systems for detecting the presence or absence of a fluid medium have been described in detail. Various additional changes and/or modifications in the above-described embodiments will be readily apparent to those skilled in the art and any such changes or modifications are deemed to be within the spirit and scope of the present invention as set forth in the appended claims.

I claim:

1. A system for detecting the presence or absence of a medium comprising:
   radiation emitting means,
   radiation responsive means selectively coupled to said radiation emitting means responsive to the absence of the medium, said radiation responsive means having an electrical property which varies in response to the incidence of radiation thereon,
   a selectively energizable switch means comprising a transistor having a control element, energization of said selectively energizable switch means being controlled responsive to preselected variations in the electrical property of said radiation responsive means,
   selectively energizable coupling means having a predetermined substantially constant voltage threshold level coupling said radiation responsive means and said control element of said selectively energizable switch means for controlling the state of energization of said selectively energizable switch means responsive to variations in the electrical property of said radiation responsive means substantially independently of variations in power being supplied to said system, and a gate-controlled output switch means having a gate, said gate connected in parallel relationship with the collector-emitter circuit of said transistor, whereby gating signals are shunted through said collector-emitter circuit preventing conduction of said output switch means when said transistor is conductive and are applied to said gate to render said output switch conductive when said transistor is non-conductive.

2. A system in accordance with claim 1 wherein said radiation emitting means comprises an electrically energizable light emitter adapted to emit light in response to electrical energization and said radiation responsive means comprises a light responsive device having a resistance which varies in response to the incidence of light thereon, said light emitter being optically coupled to said light responsive device only in the absence of said medium.

3. A system in accordance with claim 2 wherein said light responsive device comprises a photoelectric cell having a relatively high resistance mode in the absence of light incident thereon and a relatively low resistance mode in response to the presence of light incident thereon.

4. A system in accordance with claim 3 wherein a resistor is provided connected to said photoelectric cell to define a first voltage divider including a junction between said resistor and said photoelectric cell, said first voltage divider being adapted to be connected across a source of electrical power, said junction being coupled to one terminal of said coupling means for controlling the state of energization thereof responsive to the voltage established at said voltage divider junction, the other terminal of said coupling means being coupled to said control element.

5. A system in accordance with claim 4 wherein said coupling means comprises a zener diode, said zener diode being maintained in an energized state and supplying an energizing signal to said control element of said selectively energizable switch means when the voltage at said junction is at a first predetermined level responsive to operation of said photoelectric cell in its high resistance mode.

6. A system in accordance with claim 5 wherein said zener diode has a substantially lower resistance when in its energized state relative to the resistance of said photoelectric cell in the absence of light incident thereon so as to shunt current away from said photoelectric cell and maintain said selectively energizable switch energized.

7. A system in accordance with claim 6 wherein said zener diode is maintained in a de-energized state and blocks the application of energy to said control element of said selectively energizable switch means when the voltage at said junction is at a second predetermined level responsive to operation of said photoelectric cell in its low resistance mode, said photoelectric cell, when in its low resistance mode shunting current from said zener diode to prevent energization thereof.

8. A system in accordance with claim 7 wherein said transistor has its base connected to said zener diode.

9. A system in accordance with claim 1 wherein said radiation responsive means is connected to said gate and to the collector-emitter circuit of said transistor, whereby gate current for said output switch is supplied through said photoelectric cell when said transistor is non-conductive and said photoelectric cell is operative in its low resistance mode and gate current is shunted away from said gate through said photoelectric cell and the collector-emitter circuit of said transistor when said transistor is conductive and said photoelectric cell is operative in its high resistance mode.

10. A system for detecting the presence or absence of a medium comprising:

radiation emitting means, said radiation emitting means comprising an electrically energizable light emitter adapted to emit light in response to electrical energization, radiation responsive means comprising a photoelectric cell having a relatively high resistance mode in the absence of light incident thereon and a relatively low resistance mode in response to the presence of light incident thereon said radiation responsive means being optically coupled to said radiation emitting means only in the absence of said medium, a selectively energizable switch means having a control element, energization of said selectively energizable switch means being controlled responsive to preselected variations in the resistance of said radiation responsive means, selectively energizable coupling means having a predetermined substantially constant voltage threshold level coupling said radiation responsive means and said control element of said selectively energizable switch means for controlling the state of energization of said selectively energizable switch means responsive to variations in the resistance of said radiation responsive means substantially independently of variations in power being supplied to said system said coupling means comprising a zener diode, said zener diode being maintained in an energized state and supplying an energizing signal to said control element of said selectively energizable switch means when the voltage at said junction is at a first predetermined level responsive to operation of said photoelectric cell in its high resistance mode, said zener diode having a substantially lower resistance when in its energized state relative to the resistance of said photoelectric cell in the absence of light incident thereon so as to shunt current away from said photoelectric cell and maintain said selectively energizable switch energized, a resistor connected to said photoelectric cell to define a first voltage divider including a junction between said resistor and said photoelectric cell, said first voltage divider being adapted to be connected across a source of electrical power, said junction being coupled to one terminal of said coupling means for controlling the state of energization thereof responsive to the voltage established at said voltage divider junction, the other terminal of said coupling means being coupled to said control element, and another resistor connected to said light emitter to define a second voltage divider having a junction defined therebetween, said second voltage divider being connected across said first voltage divider, and means are coupled between said junctions of said first and second voltage dividers for maintaining said junctions electrically isolated from each other only when said light emitter is operable and for shunting current from said junction of said first voltage divider to prevent energization of said selectively energizable switch means responsive to improper operation of said light emitter.

11. A system in accordance with claim 10 wherein said means coupled between said junctions comprises a normally reverse biased diode which is operative to shunt current from said photoelectric cell and through said another resistor responsive to improper operation of said light emitter.

12. A system in accordance with claim 10 wherein said means coupled between said junctions comprises a zener diode.

13. A system for detecting the presence or absence of a medium comprising:
  radiation emitting means comprising an electrically energizable light emitter adapted to emit light in response to electrical energization,
  radiation responsive means comprising a photoelectric cell having a relatively high resistance mode in the absence of light incident thereon and a relatively low resistance mode in response to the presence of light incident thereon said radiation responsive means being optically coupled to said radiation emitting means only in the absence of said medium,
  a selectively energizable switch means having a control element, energization of said selectively energizable switch means being controlled responsive to preselected variations in the resistance of said radiation responsive means,
  selectively energizable coupling means having a predetermined substantially constant voltage threshold level coupling said radiation responsive means and said control element of said selectively energizable switch means for controlling the state of energization of said selectively energizable switch means responsive to variations in the resistance of said radiation responsive means substantially independently of variations in power being supplied to said system,
  a resistor connected to said photoelectric cell to define a first voltage divider including a junction between said resistor and said photoelectric cell, said first voltage divider being adapted to be connected across a source of electrical power, said junction being coupled to one terminal of said coupling means for controlling the state of energization thereof responsive to the voltage established at said voltage divider junction, the other terminal of said coupling means being coupled to said control element,
  said coupling means comprises a zener diode, said zener diode being maintained in an energized state and supplying an energizing signal to said control element of said selectively energizable switch means when the voltage at said junction is at a first predetermined level responsive to operation of said photoelectric cell in its high resistance mode,
  said zener diode having a substantially lower resistance when in its energized state relative to the resistance of said photoelectric cell in the absence of light incident thereon so as to shunt current away from said photoelectric cell and maintain said selectively energizable switch energized,
  said zener diode maintained in a de-energized state blocking the application of energy to said control element of said selectively energizable switch means when the voltage at said junction is at a second predetermined level responsive to operation of said photoelectric cell in its low resistance mode, said photoelectric cell, when in its low resistance mode shunting current from said zener diode to prevent energization thereof,
  said selectively energizable switch means comprising a transistor having its base connected to said zener diode, and
  a gate-controlled output switch means having a gate, said gate being connected in parallel relationship with the collector-emitter circuit of said transistor, whereby gating signals are shunted through said collector-emitter circuit preventing conduction of said output switch means when said transistor is conductive and are applied to said gate to render said output switch conductive when said transistor is non-conductive.

14. A system in accordance with claim 13 wherein said photoelectric cell is connected to said gate and to the collector-emitter circuit of said transistor, whereby gate current for said output switch is supplied through said photoelectric cell when said transistor is non-conductive and said photoelectric cell is operative in its low resistance mode and gate current is shunted away from said gate through said photoelectric cell and the collector-emitter circuit of said transistor when said transistor is conductive and said photoelectric cell is operative in its high resistance mode.

15. A system in accordance with claim 14 wherein said output switch means comprises a silicon controlled rectifier.

16. A system in accordance with claim 14 wherein said output switch means comprises a triac.

17. A system in accordance with claim 14 wherein said output switch means comprises a silicon controlled rectifier.

18. A system in accordance with claim 14 wherein said output switch means comprises a triac.

19. A system for detecting the presence or absence of a medium comprising:
  radiation responsive means, a resistor connected to said radiation responsive means to define a first voltage divider having a junction defined therebetween,
  radiation emitting means, another resistor connected to said emitting means to define a second voltage divider having a junction defined therebetween,
  said voltage dividers being adapted to be connected across a source of electric power, first coupling means coupled between said junctions for maintaining said junctions electrically isolated from each other only when the radiation emitting means is operable and for shunting current from said junction of said first voltage divider to prevent energization of said selectively energizable switch means responsive to improper operation of said radiation emitting means,
  a selectively energizable switch means having a control element, energization of said selectively energizable switch means being controlled responsive to preselected variations in the electrical property of said radiation responsive means, and
  selectively energizable second coupling means having a predetermined substantially constant voltage threshold level coupling said radiation responsive means and said control element of said selectively energizable switch means for controlling the state of energization of said selectively energizable switch means responsive to variations in the electrical property of said radiation responsive means substantially independently of variations in power being supplied to said system.

20. A system in accordance with claim 19 wherein said second coupling means comprises a zener diode, said zener diode being maintained in an energized state and supplying an energizing signal to said control element of said selectively energizable switch means when the voltage at said first junction is at a first predetermined level responsive to operation of said photoelectric cell in its high resistance mode.

* * * * *